(12) United States Patent
Nelson et al.

(10) Patent No.: US 7,806,432 B2
(45) Date of Patent: *Oct. 5, 2010

(54) EJECTION MITIGATION DEVICE

(75) Inventors: James E. Nelson, Salt Lake City, UT (US); Josh Allred, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 109 days.

This patent is subject to a terminal disclaimer.

(21) Appl. No.: 11/850,426

(22) Filed: Sep. 5, 2007

(65) Prior Publication Data

US 2009/0058054 A1 Mar. 5, 2009

(51) Int. Cl.
*B60R 21/16* (2006.01)
(52) U.S. Cl. .................................. 280/730.2
(58) Field of Classification Search ............. 280/730.2, 280/743.1, 743.2
See application file for complete search history.

(56) References Cited

U.S. PATENT DOCUMENTS

| | | | |
|---|---|---|---|
| 2,834,606 A | 5/1958 | Bertrand | |
| 3,804,435 A | 4/1974 | See et al. | |
| 4,657,105 A | 4/1987 | Miyada | |
| 4,906,020 A | 3/1990 | Haberer | |
| 5,470,103 A | 11/1995 | Vaillancourt et al. | |
| 5,588,672 A * | 12/1996 | Karlow et al. | 280/730.2 |
| 5,707,075 A * | 1/1998 | Kraft et al. | 280/730.2 |
| 5,988,735 A | 11/1999 | Muller | |
| 6,237,938 B1 | 5/2001 | Boxey | |
| 6,237,943 B1 * | 5/2001 | Brown et al. | 280/730.2 |
| 6,312,009 B1 * | 11/2001 | Håland et al. | 280/729 |
| 6,474,681 B2 | 11/2002 | Peer et al. | |
| 6,502,854 B2 | 1/2003 | Mueller | |
| 7,083,188 B2 | 8/2006 | Henderson et al. | |
| 7,165,783 B2 * | 1/2007 | Karlbauer et al. | 280/730.2 |
| 2004/0066022 A1 | 4/2004 | Mori et al. | |
| 2004/0232665 A1 | 11/2004 | Bendig et al. | |
| 2005/0082797 A1 | 4/2005 | Welford et al. | |

(Continued)

FOREIGN PATENT DOCUMENTS

DE  10115064  11/2002

(Continued)

OTHER PUBLICATIONS

Notification of Transmittal of the International Search Report and the Written Opinion of the International Searching Authority issued Aug. 1, 2008 in International Application No. PCT/US2008/052876.

(Continued)

*Primary Examiner*—Faye M. Fleming
(74) *Attorney, Agent, or Firm*—Sally J Brown; Stoel Rives, LLP (57) ABSTRACT

An airbag system for protecting a passenger in a motor vehicle including an ejection mitigation device configured to substantially cover an inside surface of the motor vehicle such as the rear window or the front windshield. The ejection mitigation device may be attached to one or more deployment guides which can then be attached to a driver or passenger side inflatable airbag. The deployment guides may be configured to guide the deployment of the ejection mitigation device during inflation of the driver and passenger side inflatable airbags.

17 Claims, 5 Drawing Sheets

U.S. PATENT DOCUMENTS

| | | |
|---|---|---|
| 2006/0097491 A1 | 5/2006 | Saberan et al. |
| 2006/0138754 A1 | 6/2006 | Hirata |
| 2006/0175814 A1* | 8/2006 | Jang et al. ................. 280/730.2 |
| 2006/0214401 A1 | 9/2006 | Hirata |
| 2007/0045999 A1 | 3/2007 | Saberan et al. |
| 2007/0046001 A1 | 3/2007 | Hirata |
| 2008/0238045 A1* | 10/2008 | Garner .................... 280/728.2 |

FOREIGN PATENT DOCUMENTS

| | | |
|---|---|---|
| DE | 198 41 347 A1 | 3/2006 |
| EP | 1264742 | 2/2005 |
| EP | 1 634 778 A1 | 3/2006 |
| EP | 1 676 758 A1 | 7/2006 |

OTHER PUBLICATIONS

Office Action issued May 15, 2009 in co-pending U.S. Appl. No. 11/731,980.

* cited by examiner

FIG. 5

EJECTION MITIGATION DEVICE

TECHNICAL FIELD

The present disclosure relates generally to the field of motor vehicle occupant protective systems. More specifically, the present disclosure relates to ejection mitigation devices for use with passenger airbag systems.

BRIEF DESCRIPTION OF THE DRAWINGS

Understanding that drawings depict only typical embodiments of the invention and are not therefore to be considered to be limiting of its scope, the embodiments will be described and explained with specificity and detail through the use of the accompanying drawings as listed below.

INDEX OF ELEMENTS IDENTIFIED IN THE DRAWINGS 50 vehicle
50' vehicle
100 inflatable airbag
100' inflatable airbag
144 A-pillar
146 C-Pillar
170 rear ejection mitigation device
172 rear window
174 front windshield
200 deployment guides
240 tether
250 slider
400 deployment guides
410 deployment guides
440 tether
442 tether
444 A-Pillar
446 C-pillar
450 slider
452 slider
470 rear ejection mitigation device
472 rear window
474 front windshield
480 front ejection mitigation device

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the invention, as claimed, but is merely representative of various embodiments. While the various aspects of the embodiments are presented in the drawings, the drawings are not necessarily drawn to scale unless specifically indicated.

As those of skill in the art will appreciate, the examples and embodiments described herein may be applied to and used with a variety of airbag deployment systems including frontal driver and passenger airbags, knee airbags, overhead airbags, curtain airbags, and the like. Thus, the examples and embodiments described herein are applicable to airbag cushions of various shapes and sizes.

Figure 1:
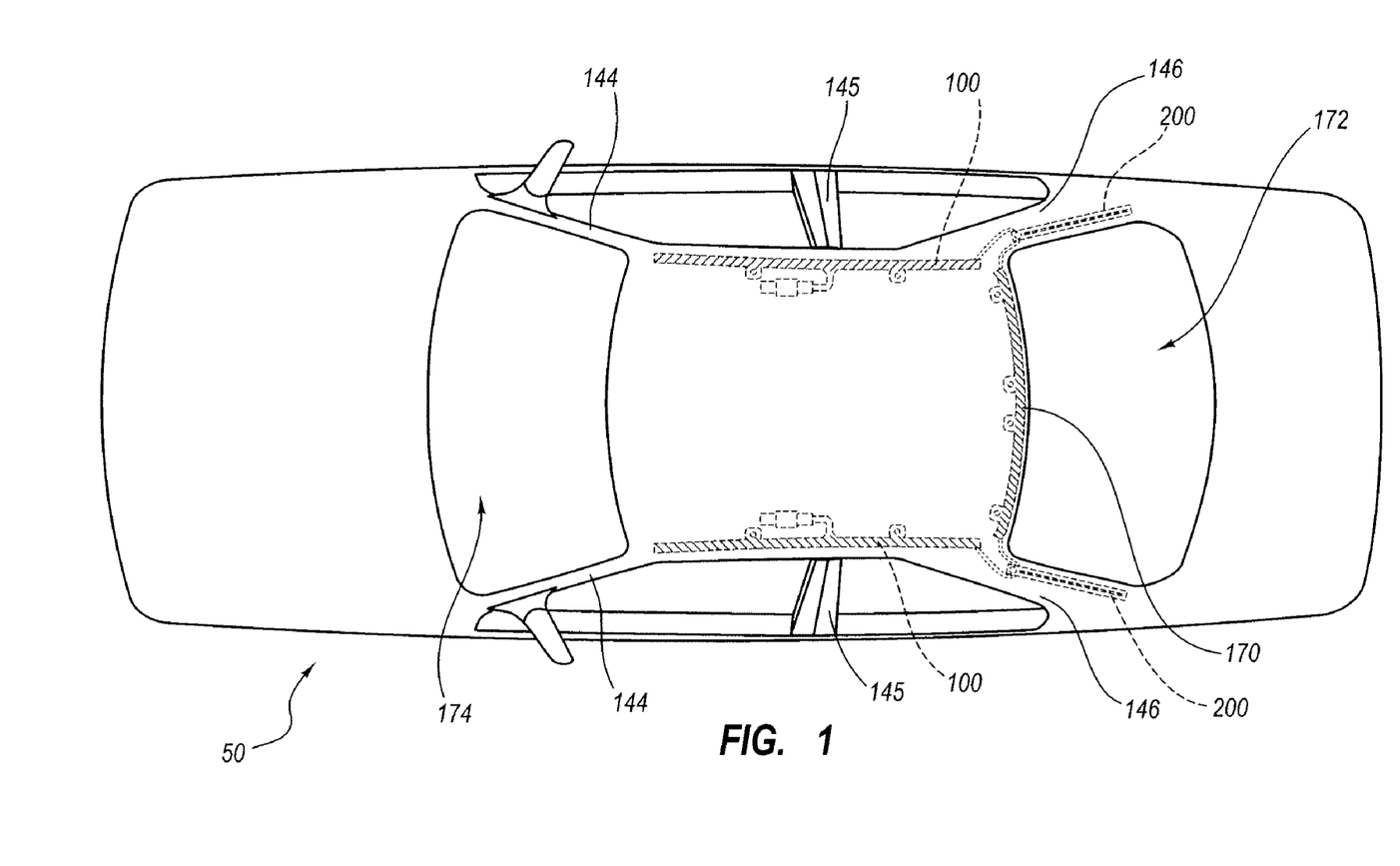
FIG. 1 is a top view of a motor vehicle with an automobile airbag and an ejection mitigation device mounted in the vehicle in the undeployed state.

Referring to FIG. 1, an airbag system for protecting a passenger in a motor vehicle may include a passenger side airbag and/or a driver side airbag such as inflatable airbags 100. The inflatable airbags 100 may be associated with one or more ejection mitigation devices that may be configured to prevent the ejection of a vehicle occupant during a collision or roll-over accident. The ejection mitigation device may be configured to cover an inside surface of the vehicle like the inside of the windshield or the inside of the rear window. The inflatable airbags 100 may be mounted on or near a roof rail inside the vehicle 50. The inflatable airbags 100 may extend from the A-pillar to the C-pillar 146 in the vehicle 50. In alternative embodiments, the inflatable airbags 100 may extend from the A-pillar 144 to a D-pillar in larger A-D vehicles such as vans and large sport utility vehicles.

With continued reference to FIG. 1, a rear ejection mitigation device 170 ("REMD 170") can be configured to protect a vehicle occupant from ejection from the rear window of the vehicle 50. The ejection mitigation device may be non-inflatable or be inflatable or partially inflatable. The ejection mitigation device may be formed from a mesh, a net, a flat fabric, or other appropriate material. In the undeployed state, the REMD 170 may be mounted and stored in the roof rail of the motor vehicle 50. In one example, the ejection mitigation device may be linked to a deployment guide configured to direct the deployment of the ejection mitigation device. Deployment guides may be mounted inside the vehicle, such as along the lateral edges of a front windshield or a rear window. In many vehicles, the front windshield and rear windows are not vertical, but are angled, and the top edges of the window may extend over a vehicle occupant. As such, the deployment of an ejection mitigation device for the front or rear windows needs to be directed along the contours of the window, toward the bottom of the window, and substantially along the inside surface of the window to ensure the best passenger protection and ejection mitigation.

Figure 2:
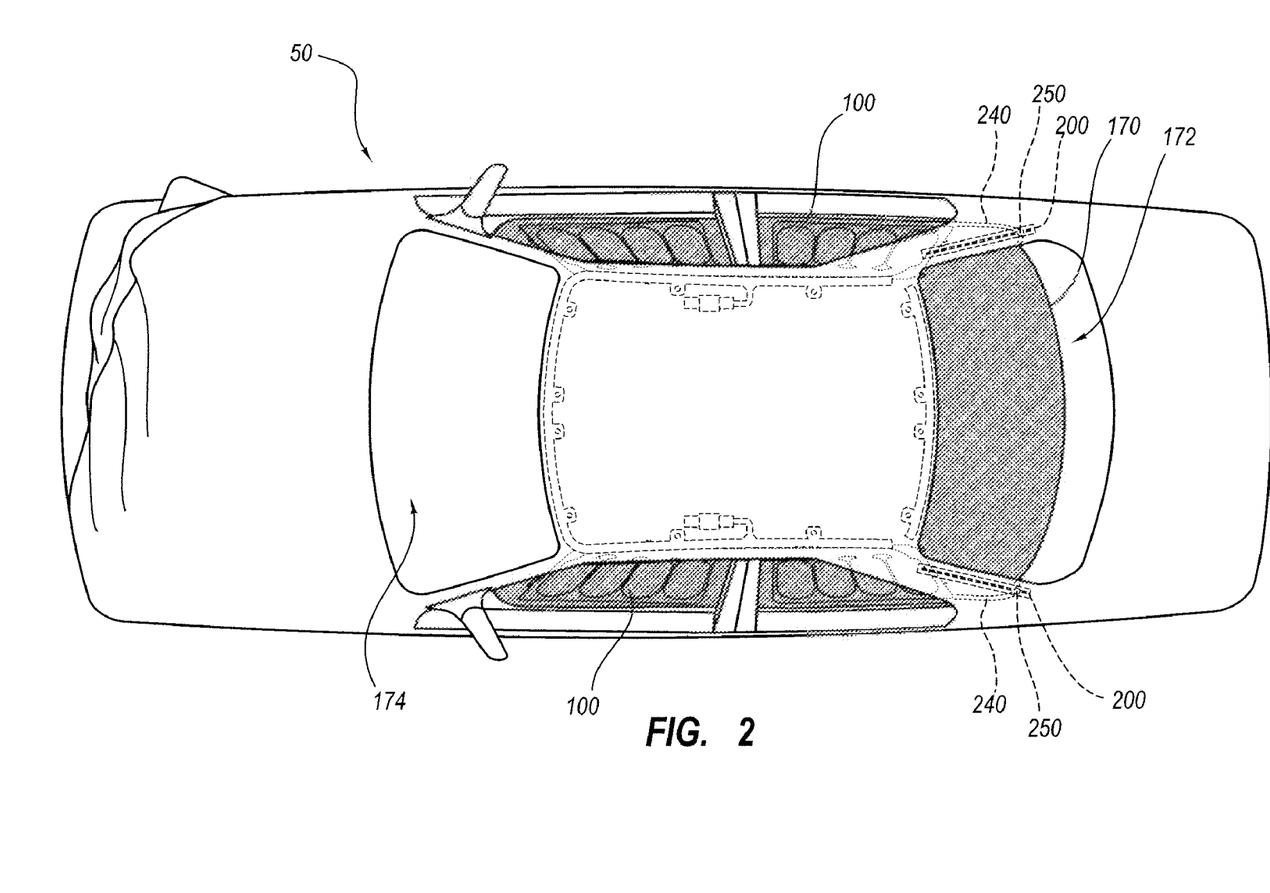
FIG. 2 is a top view of the motor vehicle shown in FIG. 1 with the automobile airbag and the ejection mitigation device in the deployed state.
Figure 3:
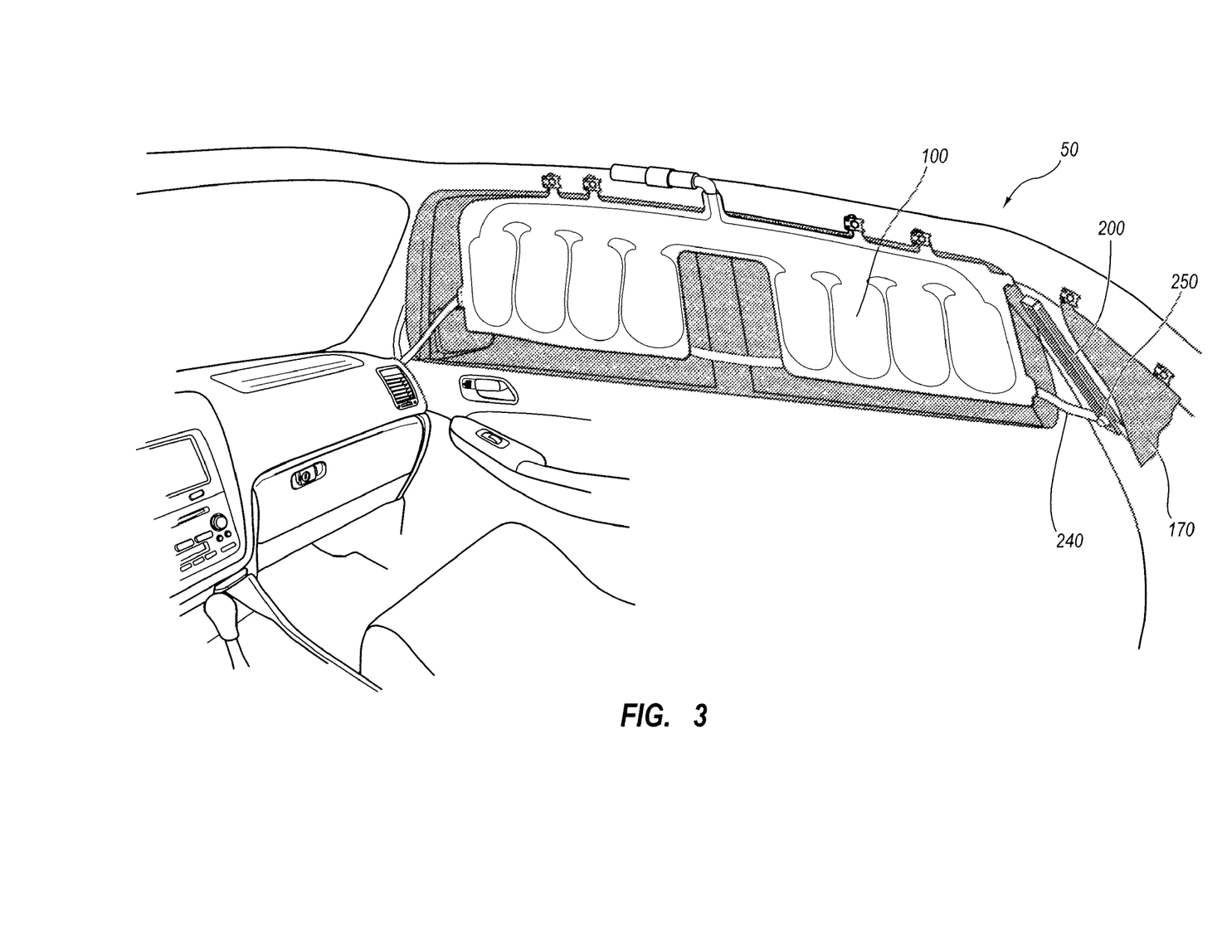
FIG. 3 is a view inside a motor vehicle with an automobile airbag and an ejection mitigation device in a deployed state.

For example, the lower edges of the REMD 170 may be attached to deployment guides 200. As shown in FIGS. 1-3, the deployment guides 200 can be mounted on the C-pillar 146 and along the outer edges of the rear window 172. The deployment guides 200 may include rails, tracks, channels, rods, or combinations thereof. In this example, the deployment guides 200 can be located between the REMD 170 and the driver and passenger side airbags 100. In this arrangement, both the REMD 170 and the passenger and driver side airbags 100 may be linked to the deployment guides 200 as shown in FIGS. 1-3. For example, the airbags 100 and the REMD 170 can be attached to the deployment guides 200 such that the force of inflation of the airbags 100 will cause the deployment of the REMD 170 down the length of the deployment guides 200. In this way, the REMD 170 will be deployed along the longitudinal axis of the deployment guides ensuring that the REMD 170 covers the rear window and remains in place during a collision or roll-over accident. Moreover, with the REMD 170 deployed and secured with the deployment guides 100, the movement of the vehicle or an occupant will not be able to displace the REMD 170 thereby preventing ejection of a passenger from the vehicle.

With further reference to FIGS. 1-3, the passenger side and the driver side airbags 100 may be linked to the deployment guides 200 with a tether 240. The tether 240 may be movably linked to the deployment guides 200 allowing the tether 240 to move down the deployment guides 200 during the inflation of the airbags 100. The tether 240 may be configured to stretch or elongate in order to follow the angle of the deployment guides 200 during the inflation of the airbags 100. Alternatively, the airbags 100 can be attached to the deployment guides 200 with a wire, a strap, a pulley system, or other means of linking the airbags 100 to the deployment guides 200. In another embodiment, the airbags 100 may be directly or indirectly attached to the deployment guides 200 with a slider such as slider 250. The slider 250 may be directly attached to the airbags 100 on one end and the deployment guides 200 at another end. Alternatively, the slider 250 may be attached to the tether 240 at one end and to the deployment guides 200 at the other. The slider 250 may be configured to movably attach to the deployment guides 200 such that the slider 250 may move along the longitudinal axis of the deployment guides 200. The slider 250 may be configured with a locking or ratcheting mechanism which allows the slider to move down the deployment guides 200 and prevents the slider 250 from moving back up the deployment guides 200.

Likewise, the REMD 170 may be linked to the deployment guides 200 with a tether or a slider such as slider 250. The slider 250 may be movably linked to the deployment guides 200 allowing the REMD 170 to move down the deployment guides 200 during the inflation of the airbags 100. Alternatively, the ejection mitigation device can be attached to the deployment guides 200 with a wire, a strap, a pulley system, or other means.

By way of example only, before inflation, the airbags 100 may be stored along the roof rail of the vehicle 50 and, toward the rear bottom edge of the airbags 100, the slider 250 or the tether 240 may be attached and stowed with the airbags 100. The tether 240 can be linked to the slider 250 which is connected near the top of the deployment guides 200. The deployment guides 200 may be positioned along both C-pillars 146 of the vehicle 50. As such, the passenger side airbag 100 is linked to a passenger side deployment guide 200 with a tether 240 or a slider 250 or both. Likewise, the driver side airbag 100 is linked to a driver side deployment guide 200 with a tether 240 or a slider 250 or both.

With continued reference to FIGS. 1-3, the REMD 170 may be attached to the roof of the vehicle 50 above the rear window 172 and be configured to span the rear width of the vehicle. During storage, the REMD 170 may be rolled or folded while allowing the bottom outside edges to be attached to a pair of sliders 250 which are linked to the passenger and driver side deployment guides 200. As shown in FIG. 2, when the passenger and driver side airbags 100 are inflated, the force of the inflation moves the sliders 250 down the deployment guides 200 while simultaneously pulling the REMD 170 down across the inside of the rear window 172 of the motor vehicle 50. In this way, the REMD 170 is deployed along the inside surface of the rear window 172 and secured in place by the deployment guides 200. The REMD 170 can be held in the deployed position by a locking or ratcheting mechanism included with the deployment guides 200 or the slider 250 or both. For example, the deployment guides 200 can be configured to allow the slider 250 to move down towards the bottom of the rear window 172 but restrict the movement of the slider 250 back towards the top of the window 172.

Figure 4:
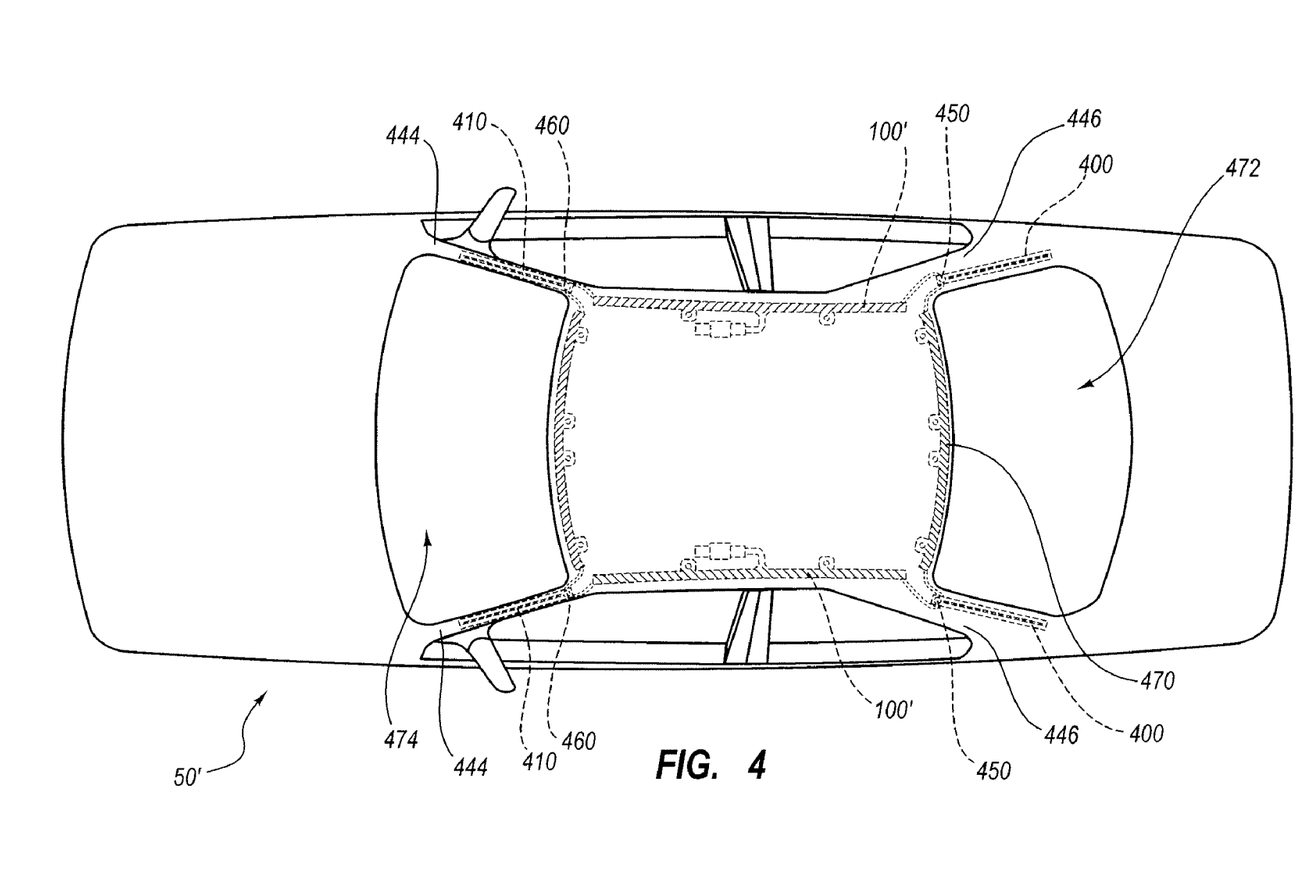
FIG. 4 is a top view of a motor vehicle with an automobile airbag and a front and a rear ejection mitigation device mounted in the vehicle in the undeployed state.

In yet another embodiment shown in FIG. 4, a rear ejection mitigation device 470 ("REMD 470") may be used in combination with a front mitigation device 480 ("FEMD 480"). In this example, the FEMD 480 is linked to a pair of deployment guides 410 mounted along the A-pillar 444 and the REMD 470 is linked to deployment guides 400 mounted on the C-pillar 446. The deployment guides 400 and 410 may be attached to the passenger's and driver's side airbags 100'. The FEMD 480 may be linked to the deployment guides 410 with a tether and/or a slider such as tether 442 and slider 452. Likewise, the REMD 470 may be linked to the deployment guides 400 with a tether and/or a slider such as tether 440 and slider 450. The slider 452 may be movably linked to the deployment guides 410 allowing the FEMD 480 to move down the deployment guides 410 during the inflation of the airbags 100'. Alternatively, the FEMD 480 can be attached to the deployment guides 410 with a wire, a strap, a pulley system, or other means.

Figure 5:
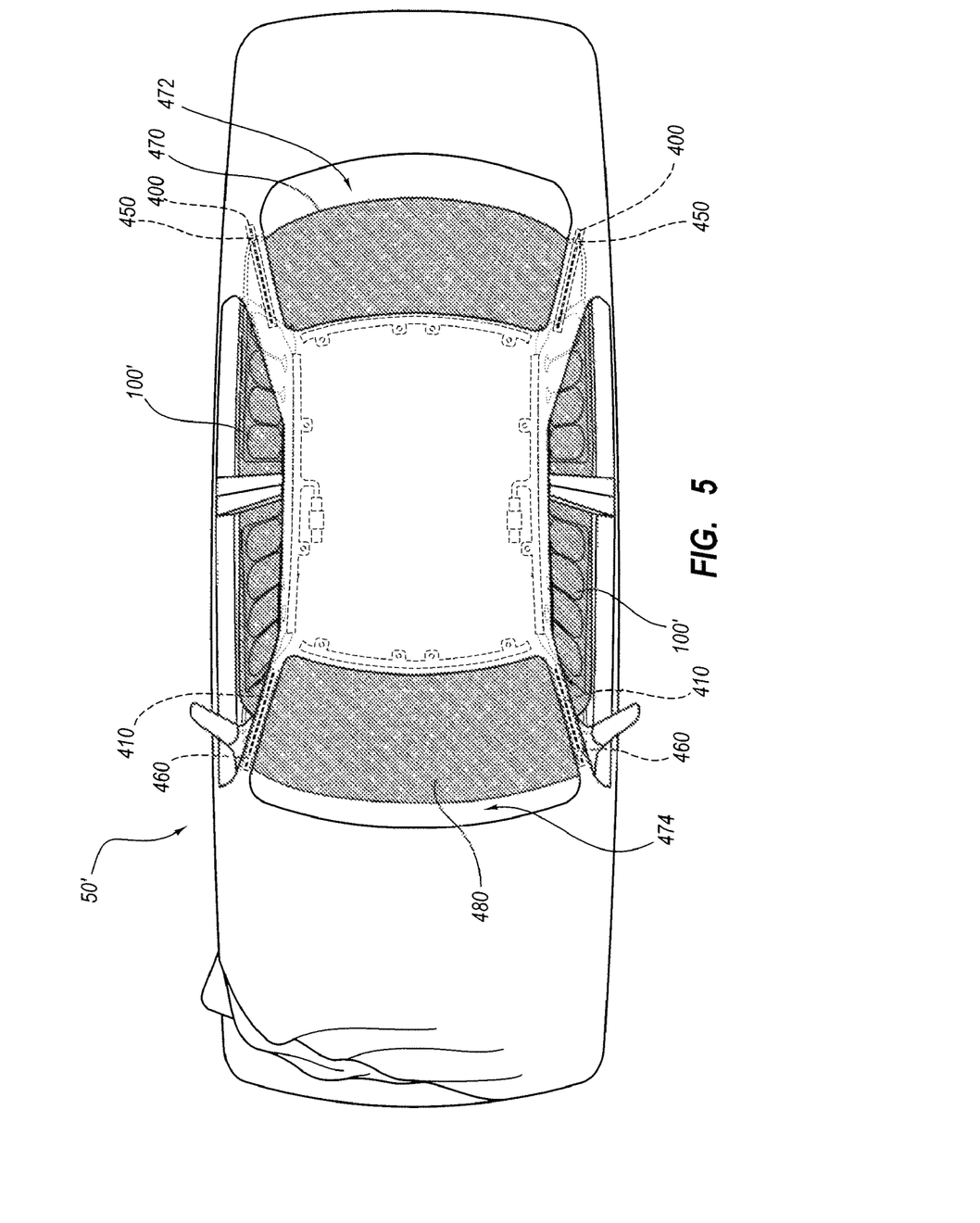
FIG. 5 is a top view of the motor vehicle shown in FIG. 4 with the automobile airbag and the front and rear ejection mitigation devices in the deployed state.

The FEMD 480 may be non-inflatable or inflatable and may be formed of a mesh, net, or other material. The FEMD 480 may be configured to extend from the roof rail or vehicle ceiling down towards the bottom of the front windshield 474 or to the surface of the vehicle dashboard. In this way, the FEMD 480 may be deployed during the inflation of the passenger and driver side airbags 100' and may cover the inside of the front windshield 474 of the vehicle 50'. The simultaneous deployment of both the REMD 470 and the FEMD 480 by the inflation of the airbags 100' may provide ejection mitigation protection to the occupants for the front windshield 474 as well as the rear window 472. Furthermore, the attachment of the FEMD 480 and the REMD 470 to the deployment guides 400 and 410 can act to stabilize the deployed airbags and prevent them from swinging outside of the motor vehicle during a collision or rollover accident.

In yet another example (not shown), the FEMD 480 may be linked to the deployment guides 410 and deployed during inflation of the passenger and driver side airbags 100' without any accompanying REMD 470. In this way, when the passenger and driver side airbags 100' are deployed, the FEMD 480 is also deployed to prevent ejection of a passenger from the front windshield 474 of the vehicle 50'. The FEMD 480 may be configured to be deployed concurrently with or independently from the inflation of the vehicle's front airbags (not shown). For example, the FEMD 480 may be configured to deploy between the front windshield 474 and the inflated front airbags of vehicle 50' thus providing for the impact protection of the front airbags as well as the ejection mitigation protection from the FEMD 480.

In another example, an ejection mitigation device, such as REMD 470 and FEMD 480, may include an inflatable chamber that may be at least partially inflated during deployment.

Various embodiments for preventing the ejection of a passenger from a vehicle have been disclosed herein. The front and rear ejection mitigation devices, alone or in combination, are examples of means for ejection mitigation and keeping a passenger's limbs, head, and body within the vehicle.

Without further elaboration, it is believed that one skilled in the art can use the preceding description to utilize the present disclosure to its fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims.

The invention claimed is:

1. An ejection mitigation system for protecting a passenger in a motor vehicle, the ejection mitigation system comprising:
a non-inflatable rear ejection mitigation device configured to substantially cover the rear window of the motor vehicle, wherein the rear ejection mitigation device has a first end opposite from a second end;
a passenger side deployment guide;
a first deployment guide slider movably attached to the passenger side deployment guide,
wherein the first deployment guide slider is linked to the first end of the non-inflatable rear ejection mitigation device;
a driver side deployment guide;
a second deployment guide slider movably attached to the driver side deployment guide,
wherein the second deployment guide slider is linked to the second end of the non-inflatable rear ejection mitigation device;
a passenger side inflatable airbag linked to the first deployment guide slider; and
a driver side inflatable airbag linked to the second deployment guide slider;
wherein the passenger side deployment guide and the driver side deployment guide are configured to guide the deployment of the non-inflatable rear ejection mitigation device; and
whereby the non-inflatable rear ejection mitigation device is deployed, when the driver side inflatable airbag and passenger side inflatable airbag are inflated, due to the movement of the second deployment guide slider in the driver side deployment guide and the first deployment guide slider in the passenger side deployment guide.

2. The ejection mitigation system of claim 1, wherein the passenger side inflatable airbag and the driver side inflatable airbag are linked to the first and second deployment guide sliders with a tether.

3. The ejection mitigation system of claim 2, wherein the deployment of the passenger side inflatable airbag and the driver side inflatable airbag pulls on the tethers and moves the first and the second deployment guide sliders down the deployment guides thereby deploying the non-inflatable rear ejection mitigation device.

4. The ejection mitigation system of claim 1, wherein the deployment guides comprise rails, tracks, channels, rods, or combinations thereof.

5. The ejection mitigation system of claim 1, wherein the first and the second deployment guide sliders move only in a single direction down the deployment guides thereby maintaining the non-inflatable rear ejection mitigation device in a deployed position.

6. The ejection mitigation system of claim 1, wherein the non-inflatable rear ejection mitigation device is attached to the motor vehicle near an upper edge of the rear window and, wherein the passenger side deployment guide and the driver side deployment guide are configured to guide the deployment of the non-inflatable rear ejection mitigation device down toward the bottom of the rear window of the motor vehicle.

7. An ejection mitigation system for protecting a passenger in a motor vehicle, the ejection mitigation system comprising:
a non-inflatable front ejection mitigation device configured to substantially cover the front windshield of the motor vehicle, wherein the non-inflatable front ejection mitigation device has a first end opposite from a second end;
a passenger side deployment guide;
a first deployment guide slider movably attached to the passenger side deployment guide,
wherein the first deployment guide slider is linked to the first end of the front ejection mitigation device;
a driver side deployment guide;
a second deployment guide slider movably attached to the driver side deployment guide,
wherein the second deployment guide slider is linked to the second end of the front ejection mitigation device;
a passenger side inflatable airbag linked to the first deployment guide slider;
a driver side inflatable airbag linked to the second deployment guide slider;
wherein the passenger side deployment guide and the driver side deployment guide are configured to guide the deployment of the front ejection mitigation device; and
whereby the non-inflatable front ejection mitigation device is deployed, when the driver side inflatable airbag and passenger side inflatable airbag are inflated, due to the movement of the second deployment guide slider in the driver side deployment guide and the first deployment guide slider in the passenger side deployment guide.

8. The ejection mitigation system of claim 7, wherein the deployment guides comprise rails, tracks, channels, rods, or combinations thereof.

9. The ejection mitigation system of claim 7, wherein the first and the second deployment guide sliders move only in a single direction down the deployment guides thereby maintaining the non-inflatable front ejection mitigation device in a deployed position.

10. The ejection mitigation system of claim 7, wherein the non-inflatable front ejection mitigation device is attached to the motor vehicle near an upper edge of the front windshield and, wherein the passenger side deployment guide and the driver side deployment guide are configured to guide the deployment of the non-inflatable front ejection mitigation device down toward the bottom of the front windshield of the motor vehicle.

11. An ejection mitigation system for protecting a passenger in a motor vehicle, the ejection mitigation system comprising:
a non-inflatable front ejection mitigation device configured to substantially cover the front windshield of the motor vehicle, wherein the non-inflatable front ejection mitigation device has a first end opposite from a second end;
a first passenger side deployment guide;
a first passenger side deployment guide slider movably attached to the first passenger side deployment guide,
wherein the first passenger side deployment guide is linked to the first end of the front ejection mitigation device;
a first driver side deployment guide;
a first driver side deployment guide slider movably attached to the first driver side deployment guide,
wherein the first driver side deployment guide is linked to the second end of the front ejection mitigation device;
a passenger side inflatable airbag linked to the first passenger side deployment guide slider;
a driver side inflatable airbag linked to the first driver side deployment guide slider;
wherein the first passenger side deployment guide and the first driver side deployment guide are configured to guide the deployment of the front ejection mitigation device; and a non-inflatable rear ejection mitigation device configured to substantially cover the rear window of the motor vehicle, wherein the non-inflatable rear ejection mitigation device has a first end opposite from a second end;
a second passenger side deployment guide;
a second passenger side deployment guide slider movably attached to the second passenger side deployment guide, wherein the second passenger side deployment guide is linked to the first end of the rear ejection mitigation device;
a second driver side deployment guide; and
a second driver side deployment guide slider movably attached to the second driver side deployment guide, wherein the second driver side deployment guide is linked to the second end of the rear ejection mitigation device;
wherein the passenger side inflatable airbag is linked to the second passenger side deployment guide slider;
wherein the driver side inflatable airbag is linked to the second driver side deployment guide slider;
wherein the second passenger side deployment guide and the second driver side deployment guide are configured to guide the deployment of the rear ejection mitigation device; and
whereby the non-inflatable front ejection mitigation device and the non-inflatable rear ejection mitigation device are deployed, when the driver side inflatable airbag and passenger side inflatable airbag are inflated, due to the movement of each deployment guide slider in each respective deployment guide.

12. An ejection mitigation system for protecting a passenger in a motor vehicle, the ejection mitigation system comprising:
an ejection mitigation device comprising a fabric curtain that is deployable between an inside surface of the motor vehicle and a vehicle occupant, wherein the non-inflatable front ejection mitigation device has a first end opposite from a second end;
a first slider that is moveably attached to a first deployment guide, wherein the first slider is linked to the first end of the ejection mitigation device;
a second slider that is moveably attached to a second deployment guide, wherein the second slider is linked to the second end of the ejection mitigation device;
a passenger side inflatable airbag linked to the first slider; and
a driver side inflatable airbag linked to the second slider;
wherein the first deployment guide and the second deployment guide are configured to guide the deployment of the ejection mitigation device substantially along the inside surface of the motor vehicle; and
wherein the first and second deployment guides comprise a locking system allowing the first and second sliders to move in a first direction but not in a direction opposite the first direction;
whereby the ejection mitigation device is deployed, when the driver side inflatable airbag and passenger side inflatable airbag are inflated, due to the movement of each deployment guide slider in each respective deployment guide.

13. The ejection mitigation system of claim 12, wherein the ejection mitigation device is at least partially inflatable.

14. The ejection mitigation system of claim 12, wherein the ejection mitigation device is configured to substantially cover the rear window on the inside of the motor vehicle.

15. The ejection mitigation system of claim 12, wherein the ejection mitigation device is configured to substantially cover the front windshield on the inside of the motor vehicle.

16. The ejection mitigation system of claim 12, wherein the passenger side inflatable airbag and the driver side inflatable airbag are linked to the first and second sliders with a tether.

17. The ejection mitigation system of claim 12, wherein the first and second deployment guides comprise at least one rail, track, channel, rod, or combinations thereof.

* * * * *